United States Patent [19]

Bächli

[11] 4,286,807
[45] Sep. 1, 1981

[54] SCREW COUPLING SAFETY MECHANISM

[75] Inventor: Ernst Bächli, Endingen, Switzerland

[73] Assignee: BBC Brown, Boveri & Company Limited, Baden, Switzerland

[21] Appl. No.: 80,771

[22] Filed: Sep. 28, 1979

[30] Foreign Application Priority Data

Oct. 20, 1978 [CH] Switzerland .................... 10863/78

[51] Int. Cl.³ ........................................... F16L 19/08
[52] U.S. Cl. ................................ 285/89; 285/382.7; 411/193; 411/198; 411/203; 411/313
[58] Field of Search .................... 285/89; 151/46, 60, 151/53

[56] References Cited

U.S. PATENT DOCUMENTS

| 1,181,109 | 5/1916 | Carr | 151/46 |
| 1,261,616 | 4/1918 | Reinicker | 151/60 X |
| 2,420,778 | 5/1947 | Herold | 285/89 |
| 2,887,891 | 5/1959 | Perez | 151/53 X |
| 3,294,141 | 12/1966 | Schotthoefer et al. | 151/46 X |

FOREIGN PATENT DOCUMENTS

| 870617 | 12/1941 | France | 151/46 |
| 375090 | 9/1939 | Italy | 151/60 |
| AD.23119 | of 1905 | United Kingdom | 151/46 |

Primary Examiner—Thomas F. Callaghan
Attorney, Agent, or Firm—Burns, Doane, Swecker & Mathis

[57] ABSTRACT

A screw coupling safety mechanism to prevent unintentional loosening of the sleeve nuts is disclosed. The safety mechanism is formed from a first toothed disc and a second toothed disk each preferably with the same diameter. Safety catches are arranged on the inner circumference of the first toothed disk for locking the first disk in position with respect to one of the sleeve nuts. Safety catches are also arranged on the inner circumference of the second toothed disk for locking the disk in position with respect to the other sleeve nuts. Retaining springs are disposed on the inner circumference of the second disk for maintaining separation between the two disks. One of the toothed disks preferably features an even number of teeth and the other toothed disk preferably features an odd number of teeth. One tooth on one disk is then bent into a space between two teeth on the other disk, after engaging the safety catches, to prevent rotation of the nuts.

4 Claims, 6 Drawing Figures

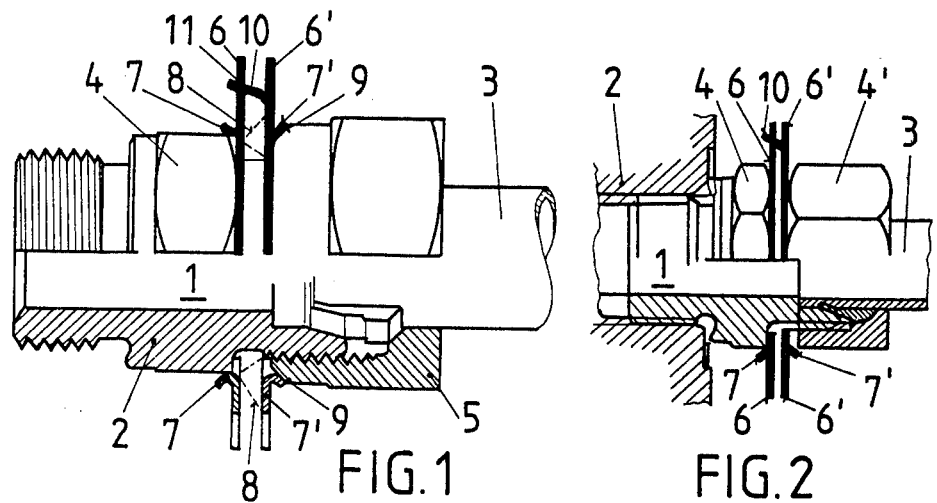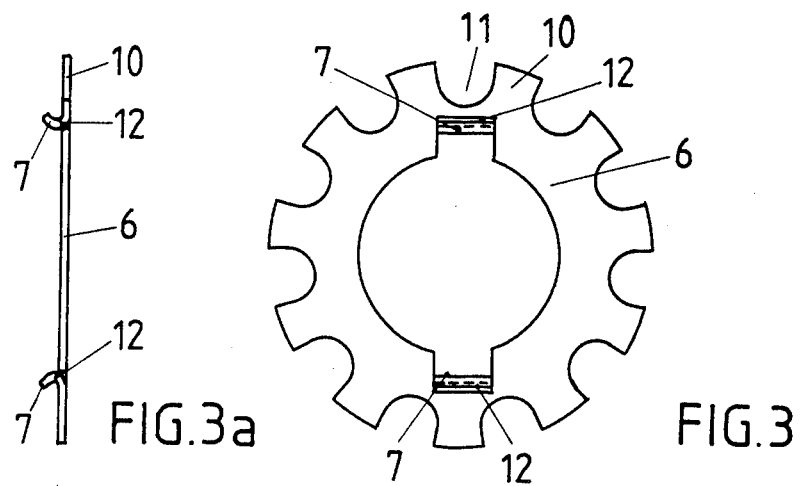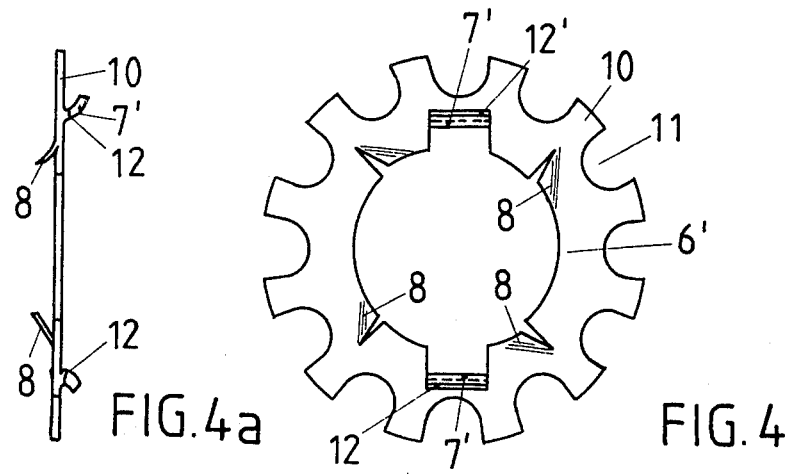

SCREW COUPLING SAFETY MECHANISM

BACKGROUND AND SUMMARY OF THE INVENTION

The present invention relates generally to a screw coupling safety mechanism.

In screw pipe couplings, a number of safety systems have been used in order to prevent an unintentional loosening of the sleeve nuts. One known method for preventing loosening of nuts is to drill a bore in the nuts and lock the nuts by means of a twisted safety wire. This method has the disadvantages that it is expensive and there is no possibility of checking whether the safety wire has been overextended by the twisting. Overextending the wire can cause breakage of the wire when the coupling is subjected to vibrations.

Another known device for securing screw pipe couplings consists of a preformed knife edge ring and a conical ring which are pressed into a tube collar when pulling on the sleeve nut (as shown for example in Ermeto Main Catalog 105/1974, Edition 3/76). The disadvantage of this safety system is that leakages can appear as a result of thermal expansions or vibrations in the pipelines. Further, this safety mechanism is expensive since a great number of knife edge rings, conical rings and tapered bushings have to be kept on hand for different pipe diameters.

It is therefore an object of the present invention to provide a screw coupling safety mechanism which can be used several times and which can be easily and cheaply produced.

The abovementioned object and others are realized in accordance with the present invention by providing a safety mechanism comprising a first toothed disk and a second toothed disk with the same outside diameter. The inner circumference of the first toothed disk includes safety catches arranged for locking the first disk in position. The inner circumference of the second toothed disk includes safety catches arranged for locking the second disk in position and retaining springs for maintaining separation between the disks. By the arrangement of one disk having safety catches and retaining springs on the inner circumference, it is possible to preserve the separation between the two toothed disks by a simple bending of the retaining springs. Also, the safety catches provided on the inner circumference of both toothed disks allow each of the disks to be locked in position on screwed nuts or on a flattened slot of a round nut.

According to a further feature of the present invention one disk is provided with an even number of teeth and the other an uneven number of teeth. With the different number of teeth on each toothed disk, for example 12 teeth on one and 11 teeth on the second disk, it is possible to more easily align and bend one tooth of one disk into a gap formed between two teeth of the second disk for every setting of the tightened nut. Since the safety catches on each disk lie against the hexagon head of a screwed nut or on a flattened-out pipe section to lock each disk against rotation, the bending of the tooth produces a locked safety mechanism.

In a preferred embodiment each toothed disk features at least two safety catches and the second of the two toothed disks additionally includes at least four safety springs. This arrangement of safety catches and retaining springs on the two toothed disks, in addition to providing satisfactory centering, also establishes a uniform separation between the two toothed disks over the entire circumference of the disks.

According to a further feature of the preferred embodiment of the present invention, the safety catches and retaining springs are bent in mutually opposed directions to one toothed disk plane. The bending of the safety catches and retaining springs in the required direction is accomplished in a simple manner, for example, by punching in deflection curve bending lines into the disks.

BRIEF DESCRIPTION OF THE DRAWINGS

A preferred embodiment of a screw coupling safety mechanism according to the present invention will be described with reference to the accompanying drawings wherein like members bear like references numerals and wherein:

FIG. 1 is a schematic view partially in cross-section of a screw pipe coupling with two toothed disks according to the present invention;

FIG. 2 is a schematic view of a screw pipe coupling similar to FIG. 1 with two hexagonal screwed nuts;

FIG. 3 is a schematic view of a toothed disk with an uneven number of teeth and safety catches according to the present invention;

FIG. 3a is a side view of the toothed disk according to FIG. 3.

FIG. 4 is a schematic view of a toothed disk with an even number of teeth including retaining springs and safety catches; and FIG. 4a is a side view of the toothed disk according to FIG. 4.

DETAILED DESCRIPTION OF THE PREFERRED EMBODIMENT

With reference to FIG. 1, a screw pipe coupling 1 consists of two pipe parts 2 and 3. The pipe parts 2 and 3 are connected with each other by means of a threaded part 4 and a sleeve nut 5. A first toothed disk 6 and a second toothed disk 6' are arranged between the threaded nut 4 and the sleeve nut 5. The first toothed disk 6 features a pair of safety catches 7 which are in contact with the outer circumference of the hexagon head of the threaded part 4. The second toothed disk 6' includes several retaining springs 8 in addition to two safety catches 7'. The retaining springs 8 (indicated in dotted lines in FIG. 1) determine the spacing between the first and second toothed disks 6 and 6'. The safety catches 7' on the second disk rest in a pair of slots 9 on the rounded sleeve nut 5. A tooth 10 from the second toothed disk 6' (which contains an even number of teeth) is bent into a gap 11 between two teeth on the first toothed disk 6 (which contains an uneven number of teeth) to positively prevent rotational disengagement of the screw pipe coupling 1.

In FIG. 2, a second embodiment of the present invention is provided with a threaded hexagonal part 4' on the screw pipe coupling 1 instead of the sleeve nut 5 (as in FIG. 1). The other elements in FIG. 2 are similar to those described with reference to FIG. 1 and accordingly are given similar reference numerals.

The first toothed disk 6 (shown in FIGS. 3 and 3a) features an uneven number of teeth. Two safety catches 7 are provided on the inner circumference and are stamped into the first disk 6 with deflection curve bending lines 12. The deflection curve bending lines facilitate bending the safety catches 7 over to the hexagon head of the threaded parts 4, 4' or to the sleeve nut 5, as the case may be, without damage occurring to the remainder of the disk.

The second toothed disk 6' (shown in FIGS. 4 and 4a) features an even number of teeth 10 and, in addition to two safety catches 7', four retaining springs 8 are preferably provided on the inner circumference of the toothed disk 6'. These retaining springs 8 are bent in the direction opposed to that of the safety catches 7' and maintain the first and second toothed disks 6 and 6' separated from one another. Alternatively, the spacing between the disks could be maintained by a separate resilient member disposed therebetween, e.g., a Belleville spring.

The prescribed toothed disk arrangement is not limited to application with screw pipe couplings. The safety system of the present invention could also be utilized, for example, between two screwed nuts (as in the embodiment of FIG. 2). Further, the number of teeth on the toothed disks is not limited. There could be more or less teeth depending on the diameter of the toothed disks. However, one of the two toothed disks preferably contains an odd number of teeth and the other disk contains an even number of teeth. The different number of teeth on each disk prevents all of the teeth on one disk from lining up with all of the teeth on the other disk when the coupling is tightened. By providing one more tooth on one disk than the other disk, the possibility that one tooth on one disk will line up with a gap between two teeth on the other disk is increased.

The principles and preferred embodiment of the present invention has been described in the foregoing specification. However, the invention which is intended to be protected is not to be construed as limited to the particular embodiment disclosed. The embodiment is to be regarded as illustrative rather than restrictive. Variations and changes may be made by those skilled in the art without departing from the spirit of the present invention.

What is claimed is:

1. A screw coupling safety mechanism in combination with a first member and second member which members are to be coupled together comprising:
    a first annular disk and a second annular disk, each of the disks having a plurality of teeth projecting from the periphery of the respective disk, said disks being of the same diameter, at least one of said teeth of one disk being bendable into a space between adjacent teeth of the other disk to prevent relative rotation of said disks;
    first locking means for selectively locking the first annular disk against rotation relative to the first member;
    second locking means for selectively locking the second annular disk against rotation relative to the second member; and
    separation means for resiliently maintaining separation between the first disk and the second disk arranged on one of the disks.

2. A screw coupling safety mechanism as in claim 1, wherein the first locking means comprises at least two portions of the first disk along the inner circumference which portions are bent away from the plane of the first disk into contact with the first member and the second locking means comprises at least two portions of the second disk along the inner circumference which portions are bent away from the plane of the second disk into contact with the second member.

3. A screw coupling safety mechanism as in claim 1, wherein the separation means comprises at least four portions of the first disk along the inner circumference which portions are bent away from the plane of the first disk toward the second disk.

4. A screw coupling safety mechanism as in claim 1, wherein one disk has one more tooth than the other disk whereby one tooth of one disk will substantially always align with a space between adjacent teeth of the other disk to be bent therebetween independent of the relative rotational location of the two disks.

* * * * *